US005434430A

United States Patent [19]

Stewart

[11] Patent Number: 5,434,430

[45] Date of Patent: Jul. 18, 1995

[54] DROP SIZE DETECT CIRCUIT

[75] Inventor: Lowell Stewart, Poway, Calif.

[73] Assignee: Hewlett-Packard Company, Palo Alto, Calif.

[21] Appl. No.: 56,011

[22] Filed: Apr. 30, 1993

[51] Int. Cl.[6] .............................................. G01N 15/06

[52] U.S. Cl. ................................ 250/573; 250/559.24

[58] Field of Search ........... 250/560, 573, 574, 214 R; 604/253, 65; 73/861.41; 346/75

[56] References Cited

U.S. PATENT DOCUMENTS

| | | | |
|---|---|---|---|
| 3,992,103 | 11/1976 | Tyley et al. | 250/574 |
| 4,063,252 | 12/1977 | Jensen et al. | 346/75 |
| 4,720,636 | 1/1988 | Benner | 250/573 |
| 4,754,149 | 6/1988 | Wang | 250/573 |
| 4,820,281 | 4/1989 | Lawler | 604/253 |

*Primary Examiner*—David C. Nelms

[57] ABSTRACT

An optical drop detect circuit for a thermal ink jet printer. The optical drop detect circuit includes an optical sensor for providing an electrical output indicative of a presence of an ink drop, a transconductance amplifier responsive to the output of said optical sensor, first and second cascaded bandpass amplifiers responsive to the transconductance amplifier, a first comparator circuit responsive to the output of the cascaded bandpass amplifiers for providing an output pursuant to optical sensing of a first minimum ink drop size, and a second comparator circuit responsive to the output of the cascaded bandpass amplifiers for providing an output pursuant to optical sensing of a second minimum ink drop size.

5 Claims, 2 Drawing Sheets

FIG. 1
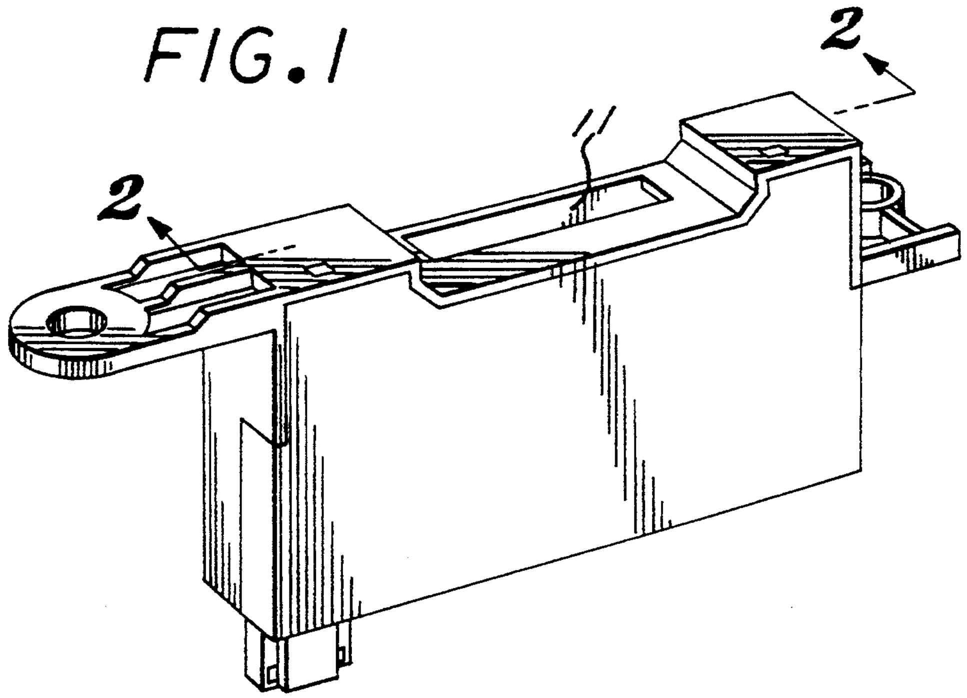
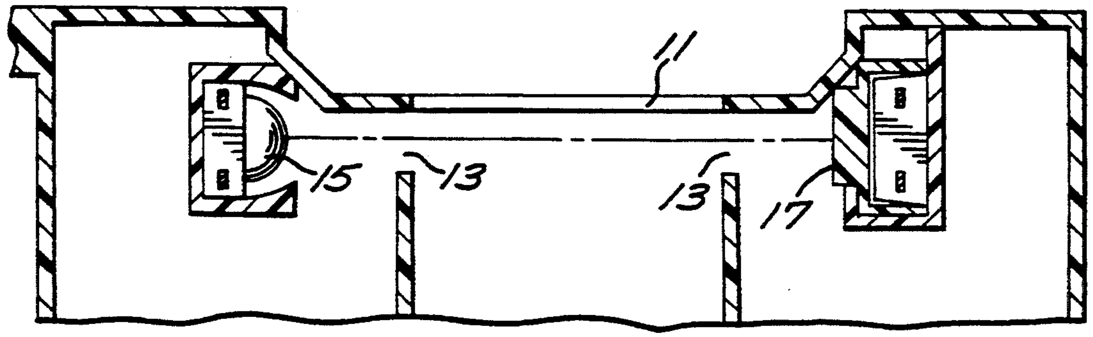
FIG. 2

DROP SIZE DETECT CIRCUIT

BACKGROUND OF THE INVENTION

The disclosed invention is directed generally to an optical drop detect, and more particularly to an optical drop detect that is capable of detecting relatively small drops of two different sizes.

Optical drop detect circuits are utilized in ink jet printers for various purposes including testing of the operation of ink drop firing nozzles of a printhead and determination of the relative positions of the nozzle arrays of multiple printheads. Optical drop detect circuits typically include a light sensor such as a photodiode which senses the light provided by a light source such as an LED. When a drop is present in the light path between the light sensor and the light source, the output of the light sensor changes since the amount of light sensed by the light sensor is reduced by the presence of the ink drop. The output of the light sensor is typically amplified and analyzed to determine whether an ink drop passed through the light path between the light source and the light sensor.

Considerations with known optical drop detect circuits include their inability to reliably detect relatively small sizes of ink drops, and the inability to reliably detect a plurality of different sizes of relatively small ink drops.

SUMMARY OF THE INVENTION

It would therefore be an advantage to provide an optical drop detect circuit for reliably detecting relatively small sizes of ink drops.

Another advantage would be to provide an optical drop detect circuit for reliably detecting different sizes of relatively small ink drops.

The foregoing and other advantages are provided by the invention in an optical drop detect circuit that includes a transconductance amplifier responsive to the output of an optical detecting element, a bandpass amplifier circuit that is tuned to match the bandwidth of the output of the optical detecting element, a first comparator responsive to the output of the bandpass amplifier circuit for providing a first comparator output that is indicative of when the bandpass output decreases below a first predetermined threshold, and a second comparator means for providing a second comparator output indicative of when that bandpass output decreases below a second predetermined threshold, whereby sensing of a drop having a size at least as large as a first minimum drop size is indicated by the first comparator output and sensing of a drop having a size at least as large as a second minimum drop size is indicated by the second comparator output.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic perspective illustration of an optical drop sensor in which the optical elements of the optical drop detect circuit of the invention can Be implemented.

FIG. 2 is a schematic sectional view illustrating the locations of the optical elements in the optical drop sensor of FIG. 1.

DETAILED DESCRIPTION OF THE DISCLOSURE

Figure 3:
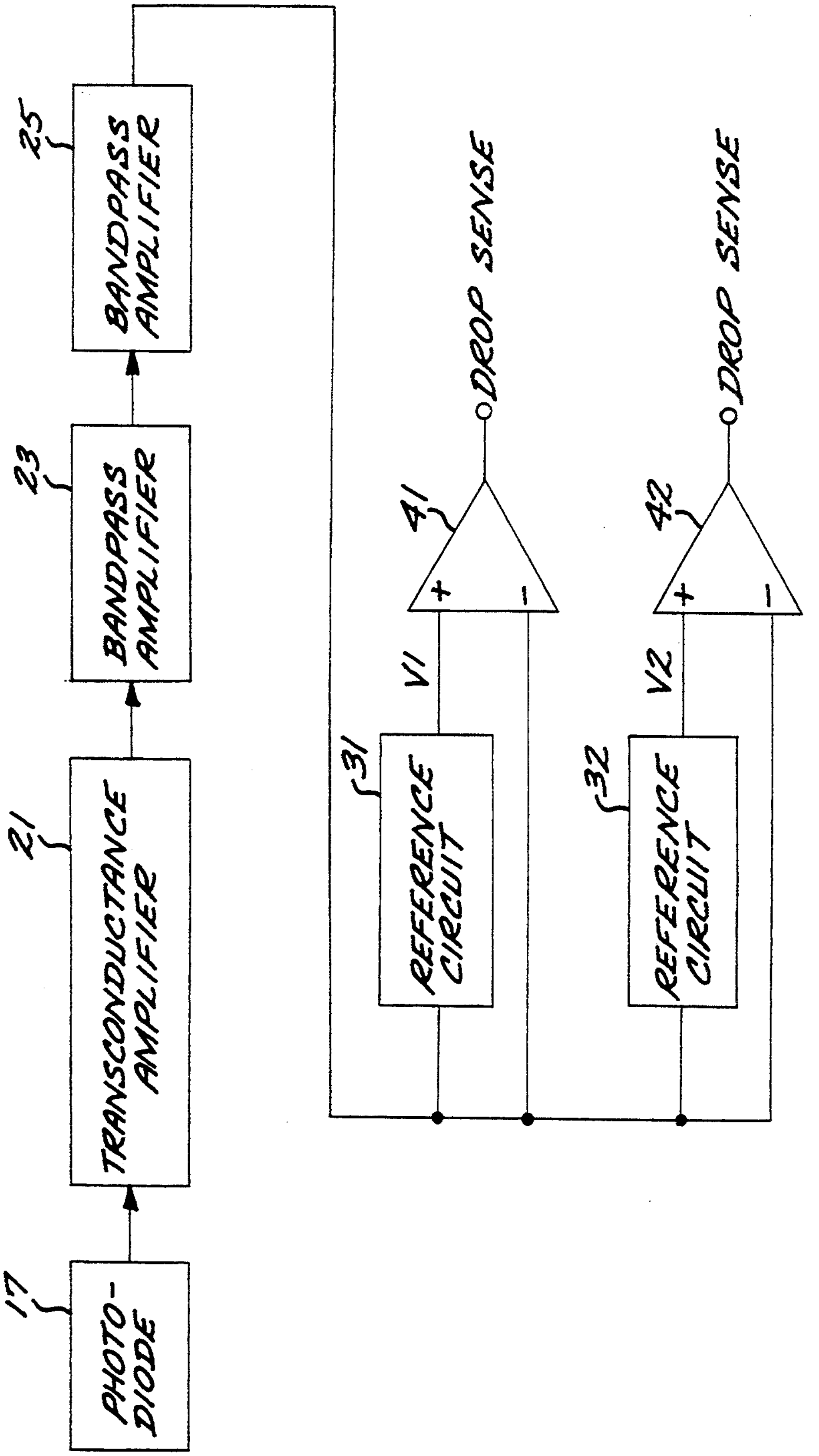
FIG. 3 is a schematic block diagram of an optical drop detect circuit in accordance with the invention.

In the following detailed description and in the several figures of the drawing, like elements are identified with like reference numerals.

The disclosed invention is directed to an optical drop detect circuit that is useful in detecting ink drops emitted by an ink jet printhead. The optical drop detect circuit includes optical elements for sensing the presence of an ink drop, and FIGS. 1–3 schematically depict by way of illustrative example an optical drop sensor in which optical elements of the drop detect circuit of the invention are implemented. In particular, the optical elements include an LED 15 and a photodiode 17 which are located opposite each other adjacent openings 13 in the narrower sides of a duct 11 contained in the optical sensor of FIG. 1. The duct 11 is rectangular in cross section that is perpendicular to the central axis of the duct, and provides for passage of ink drops through the region that is between the LED 15 and the photodiode 17. The LED 15 is controllably activated to produce a light output, and the photodiode 17 detects a portion of the light output produced by the LED 15. Thus, an optical detect zone is produced in the region between the LED 15 and the photodiode, and the presence of an ink drop in the optical detect zone causes a reduction in the electrical output of the photodiode 17.

Referring now to FIG. 3, set forth therein is a schematic block diagram of an optical drop detect circuit in accordance with the invention which includes a transconductance amplifier 21 for receiving the electrical output of the photodiode 17. The output of the transconductance amplifier 21 is a voltage that is representative of the output of the photodiode 17, and in particular decreases when the output of the photodiode decreases pursuant to the presence of an ink drop in the optical detect zone between the LED 15 and the photodiode 17. The output of transconductance amplifier 21 is provided to a first inverting bandpass amplifier 23 whose output is provided to a second inverting bandpass amplifier 25 which can have the same gain and passband as the first bandpass amplifier. By virtue of the two inversions provided by the first and second inverting bandpass amplifiers 23, 25, the output of the second bandpass amplifier 25 is a voltage signal that decreases in amplitude when the output of the photodiode 17 decreases pursuant to the presence of an ink drop in the optical detect zone.

The passband of each of the first and second bandpass amplifiers is selected to match the bandwidth or frequency spectrum of the output of the photodiode 17 for the particular range of ink drop sizes to be detected, the range of expected drop velocities, and the average shape of the light beam that is sensed by the photodiode, so that noise and signals outside of the bandwidth of interest are rejected. The first and second bandpass amplifiers effectively comprise a multi-stage bandpass amplifier wherein increased gain and sharper noise rejection are achieved by use of a plurality of stages.

The output of the second bandpass amplifier is provided to a first reference circuit 31 and to the minus input of a first digital comparator 41 which provides a drop sense output that is indicative of the optical sensing of an ink drop that is at least as large as a first minimum drop size. The output of the first reference circuit 31 is a first reference voltage V1 that allows for detection of a drop at least as large as the first minimum drop size but no detection of drops smaller than the first minimum drop size, and is provided to the plus input of first digital comparator whose drop sense output transitions to a logical 1 when the output of the second bandpass amplifier 25 decreases below the reference voltage V1.

The output of the second bandpass amplifier 25 is further provided to a second reference circuit 32 and to the minus input of a second digital comparator 42 which provides a drop sense output that is indicative of the optical sensing of an ink drop that is at least as large as a second minimum ink drop size. The output of the second reference circuit 32 is a second reference voltage V2 that allows for detection of a drop that is at least as large as the second minimum drop size but no detection of drops smaller than the second minimum drop size, and is provided to the plus input of the second digital comparator 42 whose drop sense output transitions to a logical 1 when the output of the second bandpass amplifier 25 decreases below the second reference voltage V2.

The respective minimum drop sizes detected by the digital comparators can comprise drops of the same color, or they can be different colors including for example a black drop size that is larger than the non-black drops of a color thermal ink jet printer.

By way of illustrative example, the first reference voltage V1 is a fixed percentage of the steady state average of the output of the second bandpass filter that is less than 100 percent, and the first reference circuit can comprise a voltage divider and a low pass filter wherein the fixed percentage is set by the voltage divider. Similarly, the second reference voltage is a fixed percentage of the steady state average of the output of the second bandpass filter that is less than 100 percent, and the reference circuit can comprise a voltage divider and a low pass filter. The particular percentages utilized for the first and second reference voltages V1, V2 depends on the respective minimum drop sizes intended to be detected by the first and second digital comparators. Generally, the percentage will be higher for smaller drops since the amount of decrease in the output of the optical detector will decrease with decreasing drop size. Of course, increasing the percentage will reduce immunity to noise, and the output of a digital comparator can be averaged over a plurality of a series of ink drops to determine whether a printhead nozzle is firing ink drops. For example, a nozzle can be driven to fire a predetermined number of ink drops, and the number of detected ink drops is utilized to decide whether the nozzle is operational. Where a particular minimum drop size is sufficiently large, detection of a single drop will be sufficient to reliably determine whether a nozzle is operational since the immunity to noise will be greater as a result of a larger difference between the reference voltage for the larger minimum drop size and the steady state average of the output of the second bandpass amplifier.

Thus, by providing a separate reference and comparator circuit for each minimum drop size, drop sensing is made more efficient since larger minimum drop sizes can be reliably detected with pursuant to a single drop, and reliability is enhanced since each reference voltage is fine tuned to the particular minimum drop size for which it is utilized.

It should be appreciated that while the reference voltages in the foregoing have been based on the steady state average of the output of the second bandpass amplifier, it should be appreciated that fixed reference voltages could also be utilized. It should also be appreciated that additional reference and comparator circuitry can be added for detection of additional minimum ink drop sizes.

In operation, the drop sense output of the first digital comparator or the drop sense output of the second digital comparator is selected for processing depending upon the ink drop size of the nozzle whose output is being optically detected.

Although the foregoing has been a description and illustration of specific embodiments of the invention, various modifications and changes thereto can be made by persons skilled in the art without departing from the scope and spirit of the invention as defined by the following claims.

What is claimed is:

1. An optical drop detect circuit comprising:

an optical sensor for providing an output indicative of a presence of an ink drop in a light beam sensed by the optical sensor;

amplifier means responsive to the output of said optical sensor for providing an amplified output;

bandpass amplifier means responsive to said amplified output for providing a bandpass output;

first comparator means responsive to said bandpass output for providing a first comparator output that is indicative of when said bandpass output decreases below a first predetermined threshold, said first comparator output being indicative of sensing of an ink drop having a size at least as large as a first minimum drop size; and second comparator means for providing a second comparator output indicative of when said bandpass output decreases below a second predetermined threshold, said second comparator output being indicative of sensing of an ink drop having a size at least as large as a second minimum drop size which is different from said first minimum drop size.

2. The optical detect circuit of claim 1 wherein said bandpass amplifier means includes a passband that is matched to the frequency spectrum of the output provided by said optical sensor for a particular range of ink drop sizes, a range of drop velocities, and an average shape of the beam sensed by said optical sensor.

3. The optical detect circuit of claim 2 wherein said bandpass amplifier means includes first and second bandpass amplifiers.

4. The optical detect circuit of claim 3 wherein said first and second bandpass amplifiers have identical passbands.

5. The optical detect circuit of claim 1 wherein said first and second thresholds comprise first and second percentages of a steady state average of said bandpass output.

* * * * *